(No Model.)
J. MOHN.
BARREL BUNG.
No. 599,300.  Patented Feb. 15, 1898.
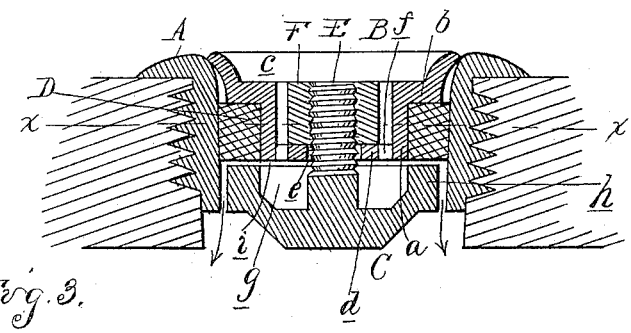
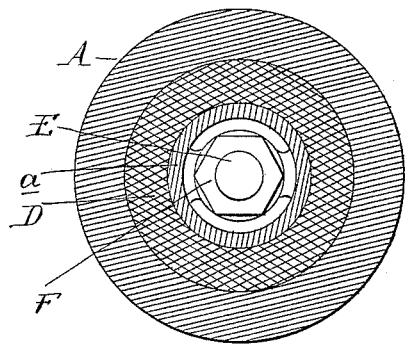
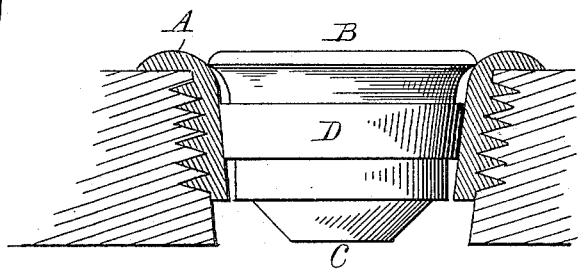
Inventor
John Mohn
By Thos. S. Sprague & Son
Att'ys.
Witnesses
Otto H. Barthel
Ink O. Dogherty.

UNITED STATES PATENT OFFICE.

JOHN MOHN, OF DETROIT, MICHIGAN.

BARREL-BUNG.

SPECIFICATION forming part of Letters Patent No. 599,300, dated February 15, 1898.

Application filed May 13, 1897. Serial No. 636,284. (No model.)

*To all whom it may concern:*

Be it known that I, JOHN MOHN, a citizen of the United States, residing at Detroit, in the county of Wayne and State of Michigan, have invented certain new and useful Improvements in Barrel-Bungs, of which the following is a specification, reference being had therein to the accompanying drawings.

This invention relates more specifically to the class of bungs in which rubber or like material is used for closing the bung air-tight. The general character of such bungs is that of having elastic material, such as a rubber disk or gasket, interposed between two metallic plates, which when clamped together by turning a screw-nut expand the rubber in the bung-hole.

The object of my present construction is to construct such a bung of metal and rubber in a manner which requires a minimum of material, so that it will be light, while at the same time there will be no closed interior spaces, which after a short time of use would make the bung foul and offensive.

Another object of my construction is to enable the bung to provide vent to the exterior of the barrel when slightly loosened, so that it need not be removed, as in the present constructions, where no provision of this character is made.

To this end my invention embodies some novel features of construction, all as more fully hereinafter described, and specifically set forth in the claim.

In the drawings which form a part of this specification, Figure 1 is a vertical central section of my improved bung as it appears when loose in the bung-hole. Fig. 2 is an elevation thereof, showing it as in closed position in the bung-hole. Fig. 3 is a horizontal section on line $x$ $x$ in Fig. 1.

A represents in section the ordinary standard bung-bushing in present use and to which my bung is shown as applied.

The bung comprises the separate parts B and C, the rubber ring D, interposed between the screw-threaded stud E and the nut F for clamping the parts together. The part B is composed of a cylindrical hollow body $a$, provided with an annular compressing-flange $b$, surmounted by the cup-shaped rim $c$. This body is provided with a diaphragm $d$, which has a central aperture $e$ and one or more apertures $f$ at or near the edge. The part C and stud E are united together or integral with each other and the part C constitutes an enlarged head for the stud, which head is made with an annular depression $g$ around the bolt and with a raised annular compression-flange $h$, which forms a counterpart of the flange $b$ for compressing the rubber ring between them. The rubber ring D is of a size to fit the body portion of the part B and projects a little distance beyond the flange $b$. The stud E passes loosely through the central aperture $e$ and projects with its screw-threaded portions into the part B to receive the nut F, which is suitably formed to engage with a suitable wrench or key for turning it.

The parts being arranged and constructed as shown and described, they are intended to operate as follows: When the nut F is turned to the right, the parts B and C operate a clamping means and clamp the rubber ring D between their compression-shoulders, and when suitable force is applied the rubber ring D is caused to expand, so that when the bung is inserted into the bung-hole it will be pressed outwardly against the walls of the bushing and hold the bung firmly in position therein and tightly close the bung-hole. In this position the rim $c$ is substantially flush with the top of the bushing, and it holds the bung from being pushed inwardly; but with the exception of this rim the parts B and C are sufficiently smaller than the interior diameter of the bushing to leave an annular space between said parts and the bushing. When the screw F' is turned in the opposite direction, the parts are separated and the lower part C drops away from the rubber ring and opens an air passage or vent $i$, which opens communication from the atmosphere into the interior of the barrel by way of the arrows shown in Fig. 1. This is one of the advantages of the construction of my bung, as in all other bungs of this character no provision is made for positively opening a vent-passage, which necessitates the removal of the bung during the time liquid is drawn off, thus giving access to flies and dust.

Another advantage of my construction is that even if a slight leakage should take place into the interior space $g$ the latter communicates with the atmosphere, which provides for the evaporation or escape of the liquid and prevents the bung from becoming foul and rotten and also permits of washing out the interior of the bung when the barrel is cleaned.

What I claim as my invention is—

In a barrel-bung, the combination of a member B formed with a hollow body portion $a$, a diaphragm $d$ provided with a central aperture $e$, and an external annular compression-flange $b$, an elastic annulus sleeved on the body portion $a$ and abutting against said compression-flange $b$, a hollow member C formed with an annular compression-flange $h$ opposite the flange $b$, and a central screw-stud E passing through said central aperture $e$, and a nut abutting against said diaphragm $d$ having a screw-threaded engagement with said stud, said diaphragm $d$ being provided with apertures communicating with the interior space of the hollow member C and with the annular space between the walls of the body portion $a$ and the nut, substantially as described.

In testimony whereof I affix my signature in presence of two witnesses.

JOHN MOHN.

Witnesses:
  FRED MOHN,
  ADOLPH BARTHEL.